(12) United States Patent
Da Palma et al.

(10) Patent No.: US 7,921,214 B2
(45) Date of Patent: Apr. 5, 2011

(54) SWITCHING BETWEEN MODALITIES IN A SPEECH APPLICATION ENVIRONMENT EXTENDED FOR INTERACTIVE TEXT EXCHANGES (75) Inventors: William V. Da Palma, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: International Business Machines Corporation

( * ) Notice: Subject to any disclaimer, the term of this patent is extended or adjusted under 35 U.S.C. 154(b) by 1085 days.

(21) Appl. No.: 11/613,040

(22) Filed: Dec. 19, 2006

(65) Prior Publication Data

US 2008/0147406 A1 Jun. 19, 2008

(51) Int. Cl.
G06F 15/16 (2006.01)
(52) U.S. Cl. ........ 709/227; 709/206; 709/207; 709/220; 709/223; 709/224; 709/225; 709/228
(58) Field of Classification Search .................. 709/206, 709/207, 220, 223, 224, 225, 227, 228
See application file for complete search history.

(56) References Cited

U.S. PATENT DOCUMENTS

| 6,012,030 | A | 1/2000 | French-St. George et al. | |
|---|---|---|---|---|
| 6,735,287 | B2 | 5/2004 | Vishik et al. | |
| 6,895,084 | B1 | 5/2005 | Saylor et al. | |
| 2001/0049603 | A1* | 12/2001 | Sravanapudi et al. | 704/270.1 |
| 2002/0052747 | A1 | 5/2002 | Sarukkai | |
| 2002/0144233 | A1 | 10/2002 | Chong et al. | |
| 2003/0046316 | A1 | 3/2003 | Gergic et al. | |
| 2003/0125958 | A1* | 7/2003 | Alpdemir et al. | 704/275 |
| 2003/0126330 | A1* | 7/2003 | Balasuriya | 710/107 |
| 2003/0187660 | A1 | 10/2003 | Gong | |
| 2004/0054740 | A1 | 3/2004 | Daigle et al. | |
| 2004/0073431 | A1 | 4/2004 | Galanes et al. | |
| 2004/0104938 | A1 | 6/2004 | Saraswat et al. | |
| 2004/0109541 | A1* | 6/2004 | Celi et al. | 379/88.13 |

(Continued)

FOREIGN PATENT DOCUMENTS

FR 2844127 A1 3/2004

OTHER PUBLICATIONS

Olsson, D., et al., "MEP—A Media Event Platform", Mobile Networks and Applications, Kluwer Academic Publishers, vol. 7, No. 3, pp. 235-244, 2002.

(Continued)

*Primary Examiner* — Liangche A Wang
(74) *Attorney, Agent, or Firm* — Wolf, Greenfield & Sacks, P.C.

(57) ABSTRACT

The present solution includes a method for dynamically switching modalities in a dialogue session involving a voice server. In the method, a dialogue session can be established between a user and a speech application. During the dialogue session, the user can interact using an original modality, which is either a speech modality, a text exchange modality, or a multi mode modality that includes a text exchange modality. The speech application can interact using a speech modality. A modality switch trigger can be detected that changes the original modality to a different modality. The modality transition to the second modality can be transparent to the speech application. The speech application can be a standard VoiceXML based speech application that lacks an inherent text exchange capability.

21 Claims, 2 Drawing Sheets

U.S. PATENT DOCUMENTS

| | | |
|---|---|---|
| 2005/0027538 A1 | 2/2005 | Halonen et al. |
| 2005/0137875 A1 | 6/2005 | Kim et al. |
| 2005/0171664 A1 | 8/2005 | Konig |
| 2007/0005366 A1* | 1/2007 | Sravanapudi et al. ..... 704/270.1 |
| 2009/0013035 A1 | 1/2009 | Hosn et al. |

OTHER PUBLICATIONS

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

Waibel et al., "Multimodal interfaces for multimedia information agents", Acoustics Speech, and Signal Processing, 1997. ICASSP-97, 1997 *IEEE International Conference* on (0-8186-7919-0) 1997. vol. 1; p. 170 vol. 1-170 vol. 1.

English translation of Office Action issued in connection with corresponding Chinese Patent Application No. 200710192735.9.

* cited by examiner

SWITCHING BETWEEN MODALITIES IN A SPEECH APPLICATION ENVIRONMENT EXTENDED FOR INTERACTIVE TEXT EXCHANGES

BACKGROUND

1. Field of the Invention

The present invention relates to the field of automated speech systems and, more particularly, to switching between modalities in a speech application environment extended for interactive text exchanges.

2. Description of the Related Art

Interactive Voice Response (IVR) systems are often used to provide automated customer service via a voice channel of a communication network. IVR systems permit routine customer requests to be quickly, efficiently, and automatically handled. When a request is non-routine or when a caller has difficulty with the IVR system, a transfer can be made from the IVR system to a customer service representative. Even when human interactions are needed, the IVR system can obtain necessary preliminary information, such as an account number and a reason for a call, which can ensure callers are routed to an appropriate human agent and to ensure human-to-human interactive time is minimized. Successful use of IVR systems allows call centers to be minimally manned while customers are provided a high level of service with relatively low periods spent in waiting queues.

IVR systems, especially robust ones having natural language understanding (NLU) capabilities and/or large context free grammars, represent a huge financial and technological investment. This investment includes costs for purchasing and maintaining IVR infrastructure hardware, IVR infrastructure software, and voice applications executing upon this infrastructure. An additional and significant reoccurring cost can relate to maintaining a sufficient number of voice quality channels to handle anticipated call volume. Further, each of these channels consumes an available port of a voice server, which has a limited number of costly ports. Each channel also consumes a quantity of bandwidth needed for establishing a voice quality channel between a caller and the IVR system.

One innovative solution for extending an IVR infrastructure to permit text-based interactive services is detailed in co-pending patent application Ser. No. 11/612,996 entitled "Using an Automated Speech Application Environment to Automatically Provide Text-Based Interactive Services." More specifically, the co-pending application teaches that a chat robot object, referred to as a Chatbot, can dynamically convert text received from a text exchange client to input consumable by a voice server and can dynamically convert output from the voice server to text appropriately formatted for the client. From a perspective of the voice server, the text-based interactions with the text exchange client are handled in the same manner and with the same hardware/software that is used to handle voice-based interactions. The co-pending solution allows for a possibility of switching between modalities, without interrupting a pre-existing communication session, which is the subject matter of this application.

It should be appreciated that conventional solutions for providing voice and text exchange services implement each service in a separate and distinct server. Each of these servers would include server specific applications tailored for a particular modality. For example, a VoiceXML based application controlling voice-based interactions can execute on a speech server and a different XML based application controlling text-based interactions can execute on a text exchange server. Any attempt to shift from a text session to a voice session or vice-versa would require two distinct servers, applications, and communication sessions to be synchronized with each other. For example, if a voice session were to be switched to a text session, a new text session would have to be initiated between a user and a text exchange serve. The text exchange server would have to initiate an instance of a text exchange application for the session. Then, state information concerning the voice session would have to be relayed to the text exchange server and/or the text exchange application. Finally, the speech application executing in the speech server would need to be exited and the original voice session between the speech server and a user terminated.

No known system or set of systems provides a dynamic intra-communication session, modality switching capability that would permit switching from a text exchange modality to a voice modality and vice-versa. Further, no known teachings exist concerning even a desirability to dynamically switch between a text exchange modality and a voice modality during an automated communication session, possibly due to assumed complications believed to be inherent with such a capability.

SUMMARY OF THE INVENTION

A solution that permits a participant engaged in an automated communication session to dynamically switch between a text exchange interaction and a voice based interaction and vice-versa at will, without disturbing a dialogue state of the automated communication session. Further, the solution permits the participant to institute a dual-mode for the communication session, which accepts input and/or provides output to different devices, each associated with a different modality. Hence, a dual mode communication session is different from a multi mode communication session. In a multi mode communication session, multiple interactive modalities are associated with a single device/client application. Notably, the solution can additionally allow users to dynamically switch to and from multimodal interactive modes during the communication session. The solution allows for the switching of interaction modes in a manner transparent to the automated server controlling session dialogue and in a manner transparent to the session-controlling application.

The present solution can be implemented in the context of a speech application environment that is extended for text-based interactive services. The speech application environment can include a Chatbot server, which manages chat robot objects or Chatbots. Chatbots can dynamically convert text received from a text exchange client to input consumable by a voice server and to dynamically convert output from the voice server to text appropriately formatted for the client. A text input API of the voice server can be used to directly accept text, so little to no conversion may be required between text exchange client output and voice server input. Output of the voice server can be in a voice markup format, from which the Chatbot can extract text (i.e., remove markup tags), which is conveyed to the text exchange client.

The present invention can be implemented in accordance with numerous aspects consistent with the material presented herein. For example, one aspect of the present invention can include a method for dynamically switching modalities in a dialogue session involving a voice server. In the method, a dialogue session can be established between a user and a speech application executing within a voice server. During the dialogue session, the user can interact using an original modality, which is either a speech modality, a text exchange modality, or a multi mode modality that includes a text exchange modality. The speech application can interact using a speech modality. A modality switch trigger can be detected that changes the original modality to a different modality. The modality transition to the different modality can be transparent to the voice server and to the speech application. Voice markup output from the voice server can also be dynamically converted to text exchange messages. The speech application can be a standard speech application that lacks an inherent text exchange capability.

Another aspect of the present invention can include a different method for dynamically switching modalities in a dialogue session involving a voice server. An automated dialogue session can be identified involving a text exchange client and a speech application. The dialogue session can also involve a Chatbot server and a voice server. During the dialogue session, the text exchange client can exchange text exchange messages over a first communication channel with the Chatbot server. In the second communication channel, the Chatbot server can send text, which the Voice server can consume using a text input API. The voice server can return text matched against a speech grammar to the Chatbot server. The Chatbot server can dynamically convert output of the Voice server to input consumable by a speech application. Then it derives corresponding text messages that are consumable by the text exchange client. The Chatbot server can detect a modality switch trigger. This detection can cause a third communication channel between the Chatbot server and voice device to be automatically established. Bidirectional voice messages for the automated dialogue session can thereafter be conveyed between the voice device and the voice server over a combination of the second communication channel and the third communication channel.

Yet another aspect of the invention can include a system for providing text exchange services that includes a text exchange client, a voice client, a speech application environment, a Chatbot server, and a modality switching engine. The text exchange client can send and receive real-time text exchanges over a text exchange channel. The voice client can send and receive speech over a voice channel. The speech application environment can include an automated speech response application that permits users to interact in real-time over a voice channel. The Chatbot server can establish a communication session involving the text exchange client and the automated speech response application. The Chatbot server can dynamically convert voice markup messages provided by the speech application to text messages. A text input API of the voice server can permit the voice server to consume text. The modality switching engine can dynamically switch a modality through which a user interacts with the automated speech response application. A dynamic modality switch can switch an activation state of the text exchange client and/or the voice client. For example, when a modality switch occurs, a user previously interacting with a text exchange client can seamlessly interact with a voice client, such as a telephony device.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
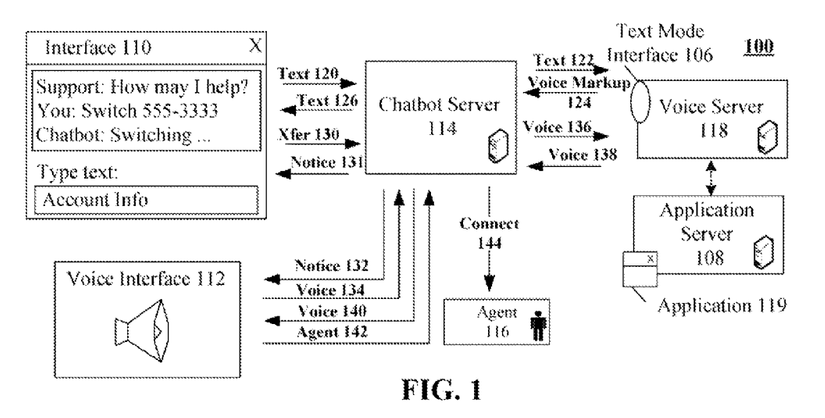
FIG. 1 is a schematic diagram of a system for a Chatbot server that permits smooth user switching between text and voice modalities without interrupting an existing communication session.

FIG. 1 is a schematic diagram of a system 100 for a Chatbot server 114 that permits smooth user switching between text and voice modalities without interrupting an existing communication session. Appreciably, the communication session is between a human and an automated speech-enabled application 119, regardless of the modality being used. System 100 permits switching between a text exchange interface 110 and a voice interface 112, each communicatively with a speech-enabled application 119, where the switching does not disrupt a dialog state for an ongoing communication session.

The speech-enabled application 119 can be a VoiceXML application, such as an application for an Interactive Voice Response System (IVR) often deployed at contact centers. The text exchange client interface 110 can be an interface for any type of text exchange communications, such as Instant Message (IM) communications, chat communications, text-messaging using SAMTIME, TRILLIAN, YAHOO! MESSENGER, and the like. The voice interface 112 can be any interface over which real time speech communications occur. For example, interface 112 can include, but is not limited to, a telephone input/output (I/O) interface, a mobile communication device (e.g., cell phone) I/O interface, a two way radio I/O interface, and/or a Voice over Internet Protocol (VOIP) interface.

The voice server 118, like most voice servers, can include a text mode interface 106, which is typically used by developers, system maintainers, and/or trainers of a speech recognition engine. For example, a set of proprietary, restricted, or standardized (e.g., MRCPv2 INTERPRET) Application Program Interfaces (APIs) can be used for the interface 106. This set of APIs, which are typically not available or accessible within a production environment, can be enabled to create a text input channel that consumes considerably fewer computing resources that a voice channel, which is typically established with the voice server 118 operating in a production environment. In most cases, the text mode interface 106 is present, but dormant, within production voice servers 118. Interface 106 can be enabled for text based interactions with Chatbot server.

Use of interface 106 occurs in a manner transparent to the application server 108 and therefore has no affect on application 119. That is, application 119 and application server 108 remain unaware that the voice server 118 is processing text input via interface 106, as opposed to voice input. The output produced by voice server 118 and sent to Chatbot server 114 can be the same in either case. Further, the output produced by the application server 108 and sent to the Chatbot server 114 can be the same. Thus, multiple communication sessions, one or more being text-based sessions that use interface 106 and others being voice based sessions can be concurrently handled by application server 108. System 110 can be implemented without infrastructure changes to application server 108 (and without changes to voice server 118 assuming interface 106 is present) and without changing code of speech enabled applications 119. This is true, even though the application 119 may lack explicitly coded support for text exchange interactions and would be unable to support such interactions without the disclosed invention. Further, the text exchange interface 110 can be any off-the-shelf text exchange software, which needs not be modified to operate as shown in system 100.

In system 100, the Chatbot server 114 can fetch 121 voice markup 123 associated with a speech enabled application 119, which it executes. The Chatbot server 114 can also relay textual input 120 from interface 110 to sent text 122 consumable by voice server 118 via interface 106. The voice server 118 can match the input against a recognition grammar and generate text output 124 for the Chatbot server 114. The Chatbot server 114 can use this output 124 when it executes the application. The application 119 processes this output, which can produce a responsive output, typically in a form of a Voice markup segment, such as VoiceXML (which can further employ the use of the W3C Speech Synthesis Markup Language or SSML). When performing text exchange operations, normal speech synthesis operations performed by the voice server 118 can be bypassed. The Chatbot server 114 can dynamically convert the responsive output from the markup into textual output 126, which interface 110 handles. For example, textural content contained between markup tags can be extracted from the application 119 markup (i.e., the markup tags can be omitted) and included within a text 126 message.

From within interface 100, a user can opt to be transferred 130 to a different communication modality and/or to a live operator, which results in Chatbot server 114 performing a switching operation. This switching can occur in a manner transparent to application server 108 and application 119 and a dialogue state of an existing communication session can be seamlessly maintained.

To illustrate, the transfer request 130 can be a request to change an interactive interface from text exchange interface 110 to voice interface 112. The voice interface 112 can be provided through a separate device, such as a phone. Upon receiving the request 130, Chatbot server 114 can send a connection terminated notice 131 to interface 110. The Chatbot server 114 can then open a voice channel between itself and voice interface 112, over which an optional introductory notice 132 can be conveyed. Voice input 134 can then be routed as input 136 to Chatbot server 114. The Chatbot server sends the voice input 136 to the voice server, which produces text result 138. The Chatbot server can generate new markup after processing result 138, which is sent (not shown) to voice server 118, which returns (not shown) voice output. The voice output can be conveyed to voice interface 112 by Chatbot server 114 as voice output 140.

A transfer request to an agent can then be sent from interface 112. The request 142 can specify whether a voice communication or a live text-exchange is preferred, assuming an option for a live text-exchange is available. A live text exchange request 142 can cause Chatbot server 114 to switch interactive interfaces from interface 112 to interface 110.

Upon receiving the agent transfer request 142, the Chatbot server 114 can connect 144 a user to live agent 116 through an appropriate communication channel. The agent 116 can automatically receive information from Chatbot server 114 regarding the current communication session. For example, a user's name, account information, and the like can be presented to agent 116, which can shorten human-to-human communication times.

It should be noted that optional notice 131 and 132 can come directly from the Chatbot server 114 instead of from voice server 118 or from application 119. It should also be noted that transfer requests (not shown) back to the text transfer interface 110 from voice interface 112 can be made to Chatbot server 114, which operate in substantially the same fashion and which do not interrupt a continuing dialogue with voice server 118.

Further, modality changes can be initiated from the application 119. For example, the application 119 can determine conditions for transferring to a live operator over a voice channel are met. The Chatbot server 114 can detect these conditions and can automatically open a channel to voice interface 112, if necessary.

In one contemplated arrangement, system 100 can implement dual mode as well as multi mode communications. A dual mode communication concurrently enables interface 110 and 112. Output from server 118 can be provided as both voice output via interface 112 and as text output via interface 110.

A multi mode communication allows both voice and text input/output to be conveyed through a single interface. For example, text exchange interface 110 can be a multi mode interface capable of receiving speech input and presenting speech output. Multi mode output (e.g., text and speech) can be presented over a multi mode interface 110.

Figure 2:
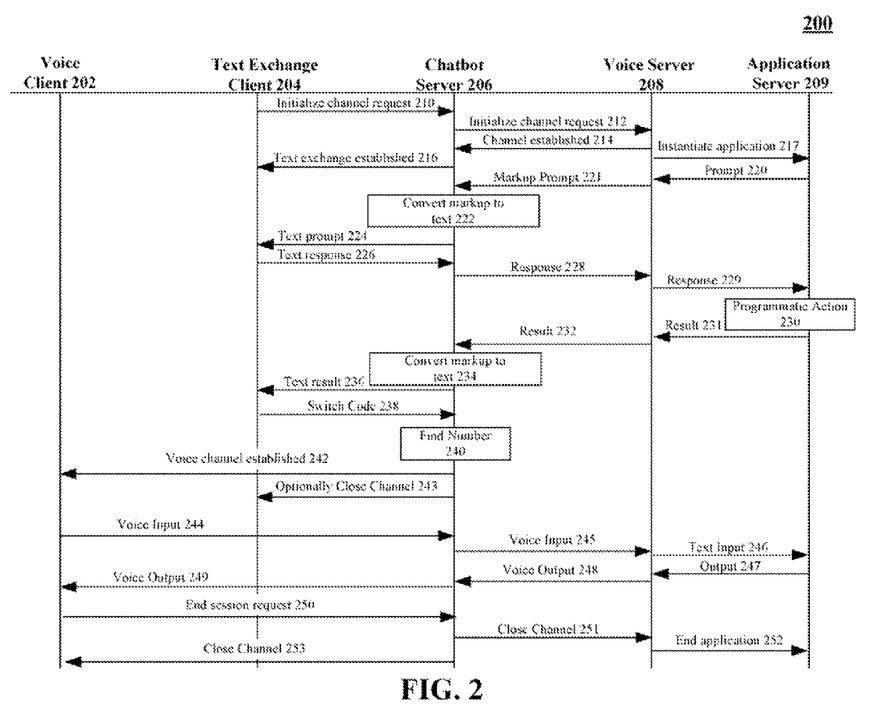
FIG. 2 is a process flow diagram showing modality switching during a communication session involving a voice client, a text exchange client, a voice client, a Chatbot server, a voice server, and an application server in accordance with an embodiment of the inventive arrangements disclosed herein.

FIG. 2 is a process flow diagram 200 showing modality switching during a communication session involving a voice client 202, a text exchange client 204, a Chatbot server 206, a voice server 208, and an application server 209 in accordance with an embodiment of the inventive arrangements disclosed herein.

The voice server 208 can include a text input API, which is typically used by developers, system maintainers, and/or trainers of a speech recognition engine. This set of APIs, which are typically not available or accessible within a production environment, can be enabled to permit the voice server 208 to directly consume text, which requires considerably fewer computing resources than those needed to process voice input, which server 208 typically receives.

As shown, client 204 can send a request 210 to Chatbot server 206 to initialize a text modality channel. Chatbot server 206 can send a channel initialization message 212 to voice server 208, to establish a session. Server 208 can positively respond, causing a channel 214 to be established between servers 206 and 208. Chatbot server 206 can then establish the requested text channel 216 with client 204. After step 216, the Chatbot server 206 can send a request 217 to application server 209, which causes a speech enabled application to be instantiated. That is, application markup 220 can be conveyed to Chatbot server 206 for execution.

Application initiated prompt 221 can occur, when the ChatBot Server 206 executes the speech enabled application 119. Server 206 can convert 222 markup provided by application 119 into pure text, represented by text prompt 224, which is sent to client 204. For example, prompt 221 can be written in markup and can include:

<prompt>text context</prompt>.

The converting 222 can extract the text context (omitting the markup tags) and generate a text prompt 224, which only includes the text context. Client 204 can respond 226 to the prompt via the text channel. Server 206 can relay response 228, which can be identical to response 226, to voice server 208. The voice server 208 can match response 228 against a speech grammar via programmatic action 230, which results in text result 232. The voice server 208 can convey text result 232 to the Chatbot server 206. Chatbot server 206 uses this output 232 when it executes the application logic 243 of executing Application 119, which results in markup being generated. The Chatbot server 206 can convert 236 textual content contained within generated markup into a text result 237, which is sent to client 204.

Interactions can continue in this fashion until client 204 sends a switch code 238 to the Chatbot server 206. The switch code 238 can specify that a modality switch from the text exchange modality to a voice modality is to occur. A telephone number for a voice device 202 can be provided. This telephone number can also be looked up from a previously stored profile or dialogue session store. Once the Chatbot server 206 finds the number 240, it can call the voice client 202, thereby establishing 242 a voice channel. The original channel with client 204 can then be optionally closed 243. That is, concurrent text and voice input/output from each client 202-204 is permitted for a common communication session.

Voice input 244 can be conveyed from voice client 202 to Chatbot server 206, which relays the voice input 245 to voice server 208. Voice server 208 can speech recognize the input 245 and provide recognition results 248 to the Chatbot server 206. The executing speech enabled application can apply 250 application logic to the results, which generates markup 252, which is conveyed to voice server 208. Voice output 254 can be generated from the markup 252, which is conveyed through Chatbot server 206 to voice client 202 as voice output 255.

Eventually, client 202 can send an end session request 260 to Chatbot server 206, which closes the channel 262 to the voice server 208 as well as the channel 264.

Figure 3:
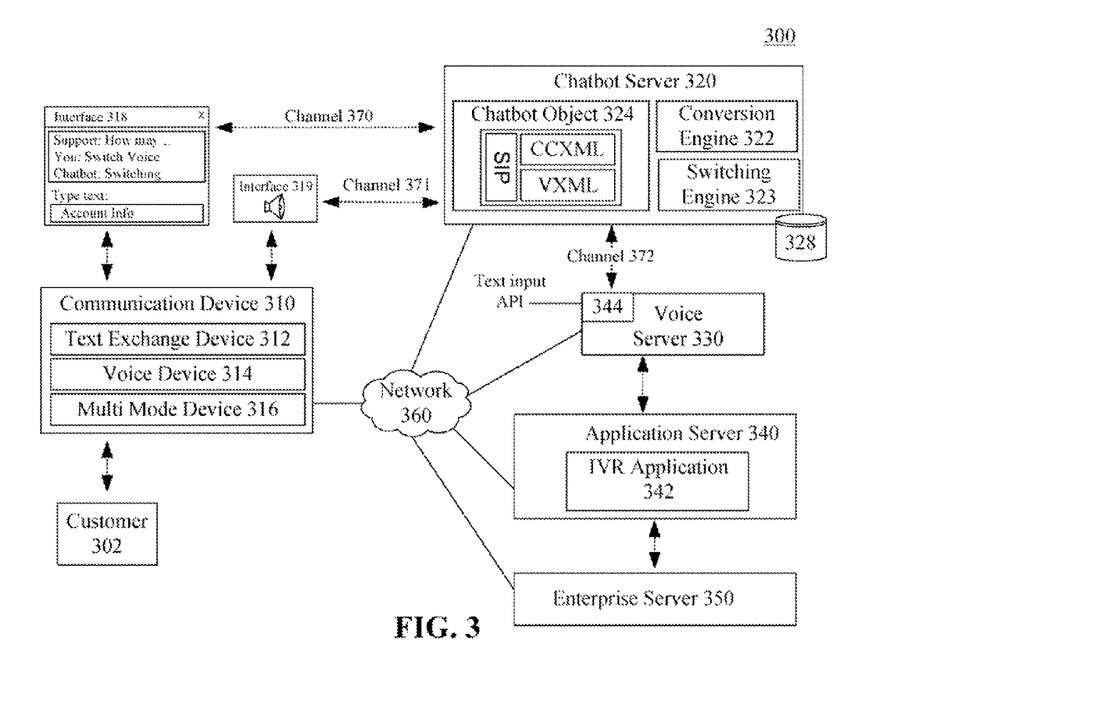
FIG. 3 is a schematic diagram of a system for providing seamless modality switching capabilities for a speech application environment in accordance with an embodiment of the inventive arrangements disclosed herein.

FIG. 3 is a schematic diagram of a system for providing seamless modality switching capabilities for a speech application environment in accordance with an embodiment of the inventive arrangements disclosed herein.

To illustrate, a communication session can be established between customer 302 and application 342, using an original modality. The original modality can be a voice modality, which uses voice interface 319 to connect to Chatbot server 320 over channel 371, which connects to voice server 330 over channel 372, which in turn connects to application server 340. The original modality can also be text exchange modality, which uses text exchange interface 318 to connect to Chatbot server 320 over channel 370, which ultimately connects to application server 340.

Sometime during the communication session, a modality switching event can occur. This event causes an activation state of one or more of the interfaces 318 and 319 to change. For instance, a text-to-voice modality switch can involve dynamically opening voice channel 371 and closing text exchange channel 370. A voice-to-text modality switch can involve dynamically opening text exchange channel 370 and closing channel 371. Either way, channel 372 remains open and unchanged and the modality change can occur in a manner completely transparent to application server 340 or executing IVR application 342.

In one arrangement, the modality switch can be customer 302 initiated via an active interface 318 or 319. A user can enter a special switching code or command, such as "switch voice" or "switch text." The switching engine 323 of Chatbot server 320 can interpret this code and perform an appropriate switching action. The modality switch can require a telephone number or other identifier be conveyed to Chatbot server 320. For example, when switching from interface 318 to interface 319, a phone number associated with interface 319 can be provided (e.g., switch voice "555-2222"). Alternatively, profile information for customer 302 or a current dialogue session can be maintained within data store 328. This profile information can include relevant contact numbers, such as phone number for connecting to voice device 314.

In another arrangement, the modality switch can be initiated by server 340. For example the IVR application can initiate a transfer request to speak with a human agent, such as the one below.

```
<form id="form1">
    <transfer name="xfer"
        dest="sip:nextagent@9.22.92.23"
        bridge="false"
        connecttimeout="5s"
        maxtime="60s"
        aai="appdata"/>
</form>
```

The transfer request can stop execution of application 342 and can signal the Chatbot server 320 about an action that will be started. The Chatbot server 320 can compare an interface 318 or 319 and/or channel 370 or 371 currently in use against an action to be started. When a different interface is needed, a modality switching action can be initiated by the Chatbot server 320.

For example, text exchange interface 318 can be active and a transfer can be initiated to a live agent over a voice channel. The Chatbot server 320 can convey a hyperlink to customer 302 that is displayed in interface 318. Clicking on the hyperlink can signify that the Chatbot server 320 is approved to initialize a voice session. The Chatbot server 320 can look up previously stored user preferences to determine which number to call to establish a voice channel 371. A user can also be prompted for a phone number, when no such number is available to the Chatbot server 320. Once the Chatbot server 320 establishes voice channel 371, channel 370 can be closed, and the Chatbot server 320 can disengage by merging channel 371 and channel 372. The application server 340 can then execute the transfer.

As shown, the system of FIG. 3 includes a network 360, which communicatively links communication device 310, Chatbot server 320, application server 340, and enterprise server 350. The network 360 can include any of a variety of components, wired and/or wireless, that together permit digitally encoded information contained within carrier waves to be conveyed from any communicatively linked component to any other communicatively linked component.

The communication device 310 can be any communication device linking a customer 302 to network 360. Devices 310 can include, for example, mobile telephones, line-based phones, computers, notebooks, computing tablets, personal data assistants (PDAs), wearable computing devices, entertainment systems, interactive media devices, and the like. Specific categories of devices 310 include a text exchange device 312, a voice communication device 314, and a multi mode device 316.

A text exchange device 312 can be a computing device capable of real-time interactive text exchanges. These text exchanges include online chatting, instant messaging, and text messaging. A communication device 314 can be any device capable of real-time voice communication over network 360. This includes VoIP based communication, traditional circuit switched communications, two-way radio communications, and the like. A multi mode device 316 is a device capable of engaging in text exchanges and in voice communications. Some multi mode devices 316 are restricted to one mode of communication at a time, while others are able to communicate across multiple modes concurrently.

Chatbot server 320 can be a VoiceXML server or equivalent device that dynamically converts text exchange messages from device 310 to messages consumable by voice server 330. Use of a text input API 344, which lets voice server 330 accept text, may permit text from device 310 to be directly consumed by voice server 330. Chatbot server 320 can also dynamically convert output from voice server 330 to output consumable by the speech application, and then making it presentable within interface 318.

For each managed communication session, the Chatbot server 320 can instantiate a Chatbot object 324. The Chatbot object 324 can include a SIP servlet and one or more interpreters, such as Call Control Extensible Markup Language (CCXML) interpreter, a Voice Extensible Markup Language (VoiceXML) interpreter, an Extensible Hypertext Markup Language (XML) plus voice profiles (X+V) interpreter, a Speech Application Language Tags (SALT) interpreter, a Media Resource Control Protocol (MCRP) interpreter, a customized markup interpreter, and the like. The SIP servlet can map incoming SIP requests to appropriate interpreters.

A communication session handled by Chatbot object 324 can involve multiple different communication channels, such as channel 370 and channel 372. Channel 370 can be a communication channel established between Chatbot server 320 and device 310. Channel 372 can be a communication channel established between Chatbot server 320 and voice server 330. Appreciably, application server 340 is not aware of a communication modality and channel type that a customer 302 uses to communicate with server 320. A special text input API 344 can be used to permit voice server 330 to directly consume textual input provided by Chatbot server 320.

The conversion engine 322 of server 320 can perform any necessary conversions to adapt output from text exchange device 312 to input consumable by voice server 330. Typically, no significant conversions are necessary for text consumed by the voice server 330, which provides access to text mode interaction functions via API 344. Appreciably, text mode interaction functions are typically used by developers during a testing and development stage, but are being used here at runtime to permit the voice server 330 to directly handle text. For example, the Internet Engineering Task Force (IETF) standard Media Resource Control Protocol version 2 (MRCPv2) contains a text mode interpretation function called INTERPRET for the Speech Recognizer Resource, which would permit the voice server 330 to directly handle text.

The application server 340 will typically generate voice markup output, such as VoiceXML output, which a voice server 330 converts to audio output. The conversion engine 322 can extract text content from the voice markup and can convey the extracted text to communication device 310 over channel 370.

Application server 340 can be an application server that utilizes modular components of a standardized runtime platform. The application server 340 can represent a middleware server of a multi-tier environment. The runtime platform can provide functionality for developing distributed, multi-tier, Web-based applications. The runtime platform can also include a standard set of services, application programming interfaces, and protocols. That is, the runtime platform can permit a developer to create an enterprise application that is extensible and portable between multiple platforms. The runtime platform can include a collection of related technology specifications that describe required application program interfaces (APIs) and policies for compliance.

In one embodiment, the runtime platform can be a JAVA 2 PLATFORM ENTERPRISE EDITION (J2EE) software platform. Accordingly, the application server 340 can be a J2EE compliant application server, such as a WEBSPHERE application server from International Business Machines Corporation of Armonk, N.Y., a BEA WEBLOGIC application server from BEA Systems, Inc. of San Jose, Calif., a JBOSS application server from JBoss, Inc. of Atlanta, Ga., a JOnAS application server from the ObjectWeb Consortium, and the like. The runtime platform is not to be construed as limited in this regard and other software platforms, such as the .NET software platform, are contemplated herein.

The IVR application 342 can be an application that permits callers to interact and receive information from a database of an enterprise server 350. Access to the VoiceXML server 320 (which has been extended for Chatbot 320) can accept user input using touch-tone signals, voice input, and text input. The IVR application 342 can provide information to the user in the form of a single VoiceXML application that can be used by any modality, including DTMF, voice, and chat. The voice markup can also be directly conveyed to conversion engine 322, where it is converted to text presentable in interface 318.

The IVR application 342 can present a series of prompts to a user and can receive and process prompt responses in accordance with previously established dialogue menus. Speech processing operations, such as text-to-speech operations, speech-to-text operations, caller identification operations, and voice authorization operations can be provided by a remotely located voice server 330. Without the intervention of Chatbot server 320, IVR application 342 would be unable to interact with text exchange device 312, since it lacks native coding for handling text exchange input/output.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for dynamically switching modalities in a dialogue session involving a voice server used by a speech application, the method comprising:
   establishing a dialogue session between a user and the speech application, wherein the dialogue session is configured to exchange communications between the user and the voice server used by the speech application via at least one communication channel connected to at least one computer, wherein the dialogue session is configured to enable the user and the speech application to interact using a first modality;
   detecting a modality switch trigger during the dialog session; and
   changing, in response to detecting the modality switch trigger, a configuration of the at least one communication channel to enable the user and the speech application to interact using a second modality that is different from the first modality, wherein the configuration of the dialog session is changed without establishing a new communication channel with the voice server used by the speech application;
   wherein the first modality and the second modality are selected from a group of modalities consisting of a speech modality, a text exchange modality, and a multi-mode modality that includes a speech modality and a text exchange modality.

2. The method of claim 1,
   wherein the first modality or the second modality is the text exchange modality; and
   wherein the text exchange modality includes at least one of an online-chat modality, an instant messaging modality, and a text messaging modality.

3. The method of claim 1, wherein the speech application is a VoiceXML based application that lacks an inherent text exchange capability.

4. The method of claim 1, wherein communications during the dialogue session involve a Chatbot server, a text exchange client, and a voice client.

5. The method of claim 4, wherein during the dialogue session the text exchange client exchanges text exchange messages over a first communication channel with the Chatbot server, the voice server exchanges messages over a second communication channel with the Chatbot server, and the voice client exchanges voice-based messages over a third communication channel with the Chatbot server, wherein the changing step changes an activation state of at least one of the first communication channel and the third communication channel.

6. The method of claim 5, wherein during the dialogue session only one of the first communication channel and the third communication channel is concurrently active.

7. The method of claim 1, wherein the user inputs a switching code provided within a message written in the original modality, wherein the switching code causes the modality switch trigger to fire.

8. A method for dynamically switching modalities in a dialogue session involving a voice server, the method comprising:
   identifying an automated dialogue session between a text exchange client and a speech application, wherein communications during the dialogue session involve a Chatbot server and a voice server, wherein during the dialogue session the text exchange client exchanges text exchange messages over a first communication channel with the Chatbot server, the voice server exchanges messages over a second communication channel with the Chatbot server, wherein the voice server uses a text interface that permits the voice server to directly consume text input, wherein the Chatbot server dynamically converts voice markup generated by the voice server to text that is provided to the text exchange client;
   the Chatbot server detecting a modality switch trigger; and
   automatically establishing a third communication channel between the Chatbot server and a voice device, wherein bidirectional voice messages for the automated dialogue session are thereafter conveyed between the voice device and the speech application.

9. The method of claim 8, wherein the speech application remains unaware of whether user entered messages originate from the first communication channel or the second communication channel and remains unaware of whether automatically generated output is conveyed to the text exchange client or to the voice device.

10. The method of claim 8, wherein the text exchange client is an off-the-shelf unmodified client, and wherein the speech application is an unmodified speech enabled application that lacks an inherent text exchange capability.

11. The method of claim 8, further comprising:
    responsive to detecting the modality switch trigger, automatically closing the first communication channel.

12. The method of claim 8, wherein the modality switch trigger is associated with a phone number for the voice device, said method further comprising:
    the Chatbot server automatically calling the phone number to establish the third communication channel.

13. The method of claim 12, wherein the phone number is conveyed to the Chatbot server within a text exchange message entered through the text exchange client.

14. The method of claim 12, wherein the phone number is automatically looked-up in a data store maintained by the Chatbot server, wherein within the data store, said phone number relates to at least one of a user of the text exchange client, a unique identifier associated with the text exchange client, a unique identifier associated with a computing device upon which the text exchange client resides, and a unique identifier associated with the dialogue session.

15. The method of claim 8, wherein a programmatic action of the speech application initiates the modality switch trigger.

16. The method of claim 8, further comprising:
    simultaneously maintaining the first communication channel, the second communication channel, and the third communication channel, wherein text exchange input from the first communication channel and voice message input from the third communication channel are conveyed to the voice server over the second communication channel.

17. The method of claim 16, wherein the first communication channel and the third communication channel are the same channel over which multi modal information is conveyed to a multi mode device that includes a text modality and a speech modality.

18. The method of claim 16, wherein the first communication channel and the third communication channel are different channels, and wherein the text exchange client is associated with a different communication channel than the voice device.

19. A system for providing text exchange services comprising:
- a text exchange client configured to send and receive text exchanges over a text exchange channel;
- a voice client configured to send and receive speech over a voice channel;
- an application server configured to execute a speech-enabled application that permits users to interact with the application over a voice channel;
- at least one computer configured to establish a communication session involving the text exchange client and the speech-enabled application, wherein the at least one computer is configured to convert messages between the text exchange client and the speech-enabled application during the communication session; and
- a modality switching engine configured to dynamically switch a modality through which a user interacts with the speech-enabled application by switching an activation state of the text exchange client and/or the voice client in response to a switching event detected during the communication session, wherein the switching is performed without establishing a new communication channel with a voice server used by the speech-enabled application;
- wherein the modality through which a user interacts with the speech-enabled application is selected from a group of modalities consisting of a speech modality, a text exchange modality, and a multi-mode modality that includes a speech modality and a text exchange modality.

20. The system of claim 19, wherein the text exchange client is an off-the-shelf unmodified client, wherein the voice client is an off-the-shelf software application and/or a telephony device, and wherein the speech-enabled application is a VoiceXML based application that lacks an inherent text exchange capability.

21. A computer system comprising:
- at least one processor programmed to:
  - establish a communication session involving a first client and a speech-enabled application, wherein the communication session is configured to enable a user to interact with the speech-enabled application using a first modality;
  - detect a modality switch trigger during the communication session; and
  - switch, in response to detecting the modality switch trigger, a configuration of the dialog session to enable the user and the speech application to interact using a second modality that is different from the first modality, wherein the switching is performed without establishing a new communication channel with a voice server used by the speech-enabled application;
- wherein the first modality and the second modality are selected from a group of modalities consisting of a speech modality, a text exchange modality, and a multi-mode modality that includes a speech modality and a text exchange modality.

* * * * *